Dec. 23, 1958 W. A. DERR ET AL 2,866,159
APPARATUS RESPONSIVE TO THE PRODUCT OF VOLTAGE
AND CURRENT OF ELECTRICAL CIRCUITS
Filed Feb. 26, 1953 2 Sheets-Sheet 1

WITNESSES:
Robert C. Baird
David M. Schiller

INVENTORS
Willard A. Derr &
Edward J. Cham.
BY C. L. Freedman
ATTORNEY

Dec. 23, 1958
W. A. DERR ET AL
2,866,159
APPARATUS RESPONSIVE TO THE PRODUCT OF VOLTAGE
AND CURRENT OF ELECTRICAL CIRCUITS
Filed Feb. 26, 1953
2 Sheets-Sheet 2
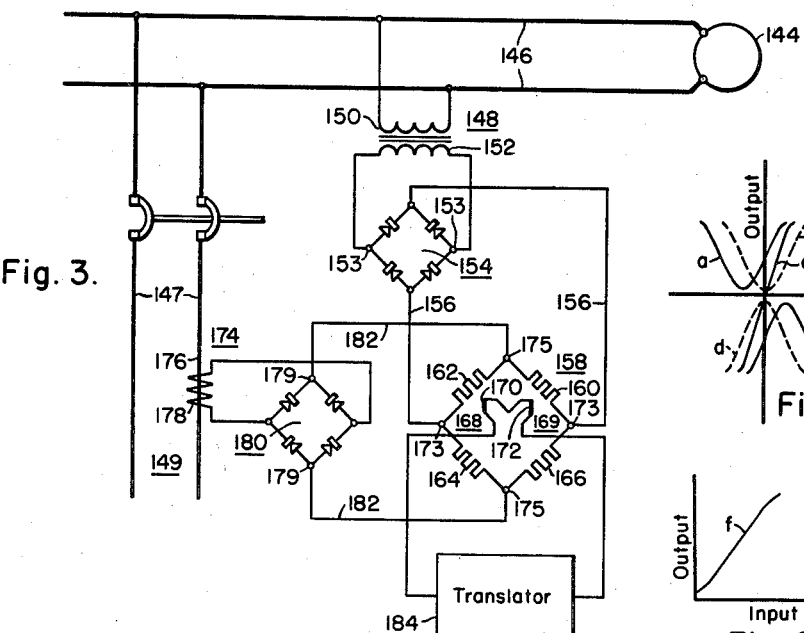
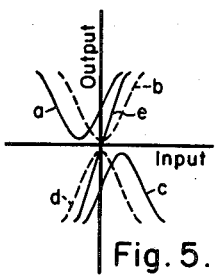
Fig. 5.
Fig. 6.
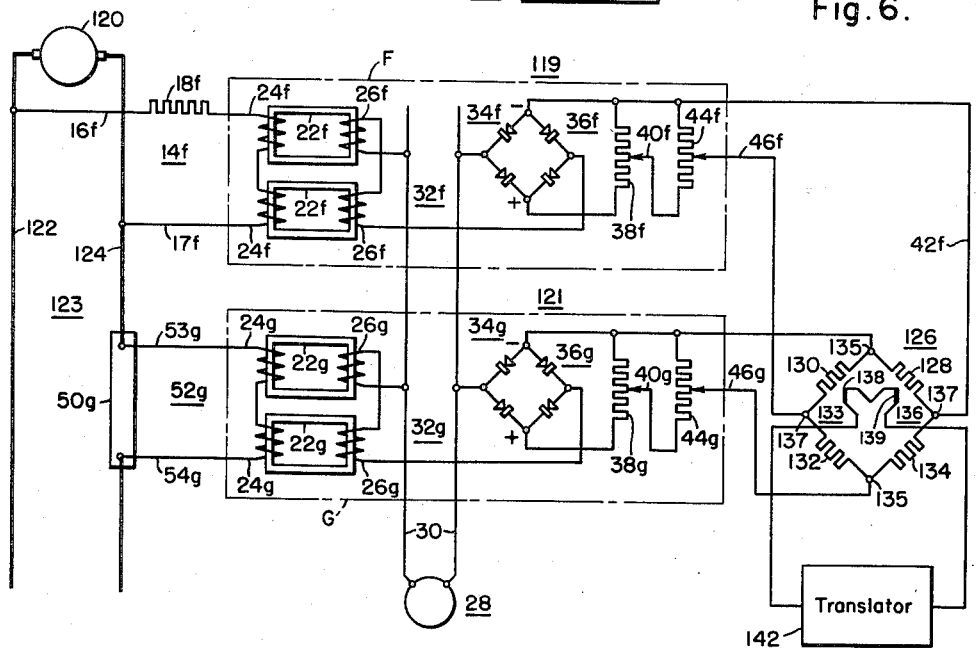
Fig. 4.
WITNESSES:
Robert C. Baird
David M. Schiller
INVENTORS
Willard A. Derr &
Edward J. Cham.
BY
C. L. Freedman
ATTORNEY

United States Patent Office 2,866,159
Patented Dec. 23, 1958

2,866,159

APPARATUS RESPONSIVE TO THE PRODUCT OF VOLTAGE AND CURRENT OF ELECTRICAL CIRCUITS

Willard A. Derr, Pittsburgh, and Edward J. Cham, Irwin, Pa., assignors to Westinghouse Electric Corporation, East Pittsburgh, Pa., a corporation of Pennsylvania Application February 26, 1953, Serial No. 338,972

11 Claims. (Cl. 324—142)

This invention relates to apparatus responsive to the product of voltage and current of electrical circuits.

According to a preferred form of the invention separate saturable magnetic core means are connected for energization in accordance with voltage and current of a direct-current circuit to produce alternating-current voltage outputs. The core means preferably have bias winding means connected to cause the voltage outputs to vary substantially in accordance with variations of voltage and current of the direct-current circuit over a wide range of values including low values. The bias winding means of the current-responsive core means are connected to cause the voltage output thereof to have polarity dependent on polarity of current in the direct-current circuit. The voltage outputs are then rectified to provide pulsating direct-current voltages which are passed through conventional filter networks to remove the alternating components therefrom. The resultant direct-current voltages are then applied to suitable translating means connected to produce a response which is a function of the magnitude and an indication of the direction of power or energy of the direct-current circuit.

The translating means may be in the form of thermal conversion means comprising a resistance bridge unit and cooperating thermocouple means effective when energized by said separate direct-current voltages to produce millivoltage outputs suitable for application to telemetering transmitters and the like.

According to another form of the invention thermal conversion means of the type described may be connected for energization through separate rectifier means which, in turn, are energized through voltage and current transformer means from an alternating-current circuit. When so connected the conversion means is effective to produce millivoltage outputs substantially proportional to volt-amperes of the alternating-current circuit.

It is an object of the invention to provide improved apparatus responsive to the product of voltage and current of an electrical circuit.

It is another object of the invention to provide improved apparatus responsive to large values of power of a direct-current circuit, said apparatus including translating means effectively insulated from the direct-current circuit.

It is still another object of the invention to provide apparatus including saturable core means, said apparatus being responsive to the magnitude and polarity of power of a direct-current circuit.

It is a further object of the invention to provide apparatus incorporating voltage and current-responsive conversion devices including saturable core means wherein output of the conversion devices are utilized to effect the energization of thermal conversion means to produce a millivoltage output which is representative of the product of voltage and current of the circuit from which the conversion devices are energized.

It is still another object of the invention to provide separate conversion devices connected respectively, for energization in accordance with current and voltage of a direct-current circuit, the current-responsive conversion device including saturable core means having bias winding means connected for rendering said current-responsive conversion device responsive to direction of current of the direct-current circuit.

It is a still further object of the invention to provide a current-responsive conversion device including saturable core means and switch means, the switch means being effective in an operating position to render the conversion device responsive to direction of current of the direct-current circuit from which the conversion device in energized.

It is still another object of the invention to provide improved apparatus responsive to volt-amperes of an alternating current circuit.

It is a further object of the invention to provide apparatus responsive to the volt-amperes of an alternating-current circuit, said apparatus incorporating thermal conversion means connected for energization through rectifier means to produce a millivoltage output which is representative of volt-amperes of the circuit.

Other objects of the invention will be apparent from the following discussion, taken in conjunction with the accompanying drawings, in which:

Fig. 3 is a schematic view illustrating apparatus responsive to the volt-amperes of an alternating-current circuit;

Fig. 4 is a schematic view illustrating apparatus responsive to power of a direct-current circuit in which thermal conversion means are utilized;

Fig. 5 is a graphical representation of the relationship between the outputs and inputs of the core means associated with the conversion device of Fig. 2; and Fig. 6 is a graphical representation of the relationship between the outputs and inputs of the core means associated with the conversion devices of Figs. 1 and 4.

Figure 1:
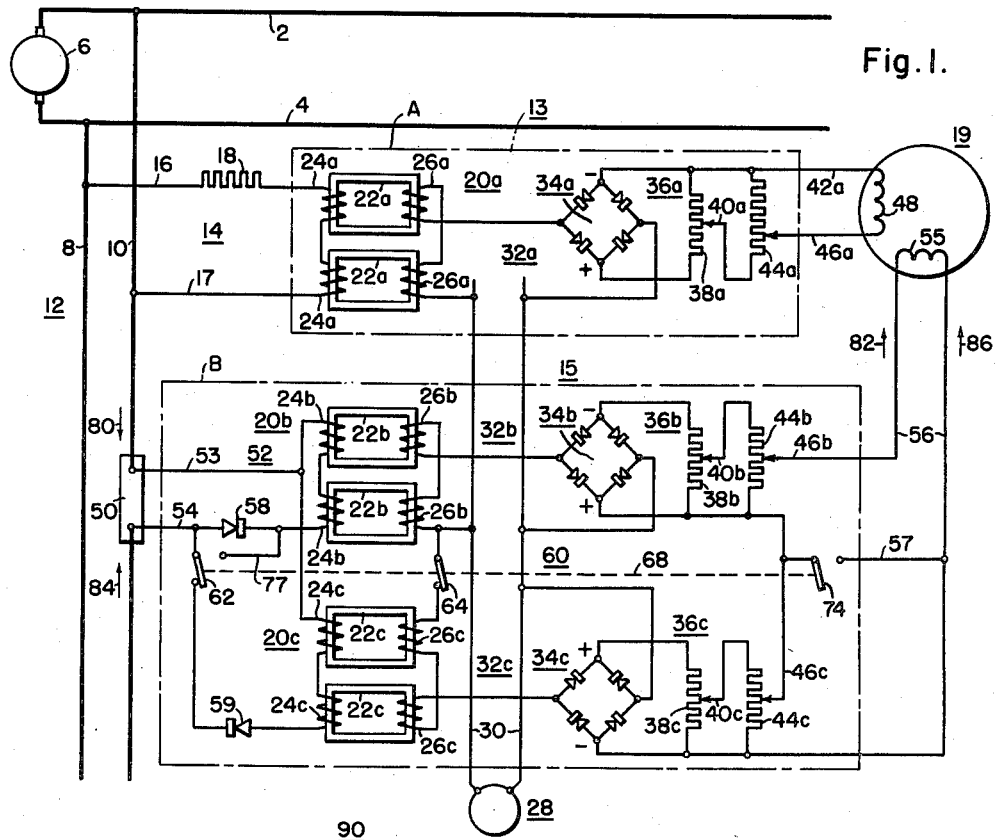
Figure 1 is a schematic view illustrating apparatus responsive to the magnitude and polarity of power of a direct-current circuit.

With reference to Fig. 1, there is illustrated a positive bus member 2 and a negative bus member 4 adapted to carry direct current when energized from a source of direct current 6. Conductors 8 and 10 are connected for energization from source 6 through bus members 2 and 4 to provide a direct current circuit 12. For purposes of the invention, it will be assumed that direct current may flow in either direction through conductor 10 of circuit 12.

In order to produce separate voltage outputs corresponding respectively to voltage and current of the circuit 12, voltage and current-responsive conversion devices 13 and 15 are provided. The devices 13 and 15 are illustrated as being contained within rectangles A and B respectively. As illustrated, the voltage-responsive conversion device 13 comprises a single conversion unit including electromagnetic means in the form of saturable core means 20a, rectifier means 34a and voltage divider means 36a associated in a manner to be described hereinafter. The current-responsive conversion device 15 comprises a pair of conversion units including electromagnetic means in the form of saturable core means 20b and 20c, rectifier means 34b and 34c and voltage divider means 36b and 36c respectively associated in a manner described hereinafter. The pair of conversion units of conversion device 15 have associated therewith means effective to cause conversion device 15 to produce a voltage output having polarity dependent on direction of current flowing in circuit 12 as will appear hereinafter.

Each of the conversion units of devices 13 and 15 has associated therewith a number of similar components. For this reason, components associated with the conversion unit of device 13 will be identified with a reference character followed by the suffix (a). Similar components associated with the pair of conversion units of device 15 will be identified by the same reference character followed by the suffix (b) or (c).

As illustrated, the conversion unit of device 13 includes core means 20a comprising a pair of magnetic cores 22a constructed of a suitable magnetic material such as soft steel, each of the cores 22a having control windings 24a and output windings 26a. The control windings 24a of the cores 22a are connected for series energization through conductors 16 and 17, which constitute an input circuit 14, in accordance with voltage of circuit 12. Conductor 16 preferably has a current limiting resistor 18 associated therewith.

By such connection of control windings 24a each of the cores 22a is magnetized to an extent dependent on the voltage of circuit 12. Output windings 26a of cores 22a are connected for series energization from a source of alternating current 28 through conductors 30 for controlling the output of the source 28. The polarities of the connections of output windings 26a are such that alternating current flowing through windings 26a induces voltages in control windings 24a which are opposed to each other. Hence, undesirable alternating voltages induced in control windings 24a cancel one another.

Since the magnetic condition of cores 22a is caused to vary in accordance with voltage of circuit 12, the impedance of windings 26a will vary in accordance with an inverse function of voltage of circuit 12. Consequently, alternating current flowing through windings 26a varies substantially in accordance with voltage of circuit 12. An output circuit 32a is provided to carry alternating current flowing through windings 26a.

Conversion means in the form of a rectifier device 34a is connected in circuit 32a for energization through windings 26a to produce a direct-current voltage output which varies as a function of alternating current flowing in circuit 32a. Rectifier device 32a is assumed to be a barrier layer rectifier such as a copper-oxide rectifier or a selenium rectifier, arranged in conventional bridge form for full-wave rectification. A suitable filter network (not shown) is preferably arranged to eliminate the ripple component of the rectifier output voltage.

The rectifier device 34a has associated therewith a voltage divider 36a including a resistance 38a having an adjustable tap 40a. The voltage output of the rectifier 34a is applied across resistance 38a. The output of voltage divider 36a appears between tap 40a and conductor 42a for application to a resistance 44a having an adjustable tap 46a. Consequently, current flowing through resistance 44a is substantially proportional to voltage of circuit 12. Therefore, a voltage corresponding to voltage of circuit 12 appears between tap 46a and conductor 42a and is applied to an operating member 48 of a translating device 19 for a purpose appearing hereinafter. Taps 40a and 46a may be adjusted to compensate for variations in the properties of the various circuit components.

In order to derive a small voltage from circuit 12 which corresponds to current flowing through circuit 12, a shunt device 50 is connected in series with conductor 10. Shunt device 50 may conveniently be a common instrument shunt device as shown. However, if a shunt device is not available, shunt output conductors 53 and 54 may be connected directly to suitably spaced portions of conductor 10.

The voltage derived from shunt device 50 is applied to the current-responsive conversion device 15 through conductors 53 and 54. As described hereinbefore, the current-responsive conversion device 15 comprises a pair of conversion units including core means 20b and 20c, rectifier means 34b and 34c and voltage divider means 36b and 36c corresponding to components 20a, 34a and 36a of the conversion unit of device 13 respectively. Hence, a description of the conversion units of device 15 is believed unnecessary.

The magnetic cores 22b and 22c of core means 20b and 20c have control windings 24b and 24c connected for parallel energization through conductors 53 and 54 in accordance with current of circuit 12. By means of parallel energization of windings 24b and 24c, and by means of components presently to be described, device 15 may be rendered polarity-responsive; that is, voltage appearing between conductors 56 for application to operating member 55 of translating device 19 may have a polarity dependent upon direction of current flow in circuit 12.

To this end unidirectional elements 58 and 59 are connected in circuit relation with respect to control windings 24b and 24c respectively, to be polarized relative to one another in a predetermined manner. Element 58 is provided with a shunt circuit 77 as shown. Each of the elements 58 and 59 may comprise a rectifier of the barrier layer type, such as a selenium rectifier, or a rectifier of the vaccum tube variety. A switch device 60, having switch arms 62, 64 and 74 connected for corresponding simultaneous movement as indicated by the connecting line 68, is provided for controlling the operation of conversion unit 15 as will presently appear. Switch device 60 is preferably manually operable.

With switch arms 62, 64 and 74 of switch device 60 in the positions shown in Fig. 1, device 15 is rendered polarity-responsive. As illustrated, switch arm 62 is in the position to interrupt shunt circuit 77, switch arm 64 is in the position to establish output circuit 32c of core means 20c, and switch arm 74 is in the position to interrupt conductor 57. The operation and effect of switch device 60 and unidirectional elements 58 and 59 is as follows:

Assuming direct current to be flowing in the direction through conductor 10 of circuit 12 as indicated by arrow 80 and assuming switch arms 62, 64 and 74 to be in the positions illustrated in Fig. 1, then voltage developed across shunt device 50 produces a current which flows through conductor 53, control winding 24c, unidirectional element 59, switch arm 62 and back to conductor 10 of circuit 12. Current flow through winding 24b is prevented by unidirectional element 58 which is polarized relative to element 59 as illustrated, and by the disposition of switch arm 62 in the position shown. Consequently, core means 20b is rendered ineffective whereas core means 20c, rectifier 34c and voltage divider 36c are effective to produce a direct-current voltage output appearing between conductors 56 which causes current flow in the direction indicated by arrow 82 through operating member 55 of translating means 19. The magnitude of such current is substantially proportional to the magnitude of current in circuit 12.

Assuming now that direct current flows through conductor 10 of circuit 12 in the direction indicated by arrow 84, and that switch arms 62, 64 and 74 are in the position illustrated in Fig. 1, then voltage developed across shunt device 50 produces a current which flows through conductor 54, unidirectional element 58, control winding 24b of core means 20b, and conductor 53 back to conductor 10 of circuit 12. Current flow through winding 24c is prevented by element 59 which is polarized relative to element 58 as shown. Consequently, core means 20c is rendered ineffective whereas core means 20b, rectifier 34b and voltage divider 36b are effective to produce a direct-current voltage output appearing between conductors 56 which causes current flow in the direction indicated by arrow 86 through operating member 55 of translating means 19. The magnitude of such current is substantially proportional to the magnitude of current in circuit 12.

If desired, conversion device 15 may be rendered ineffective as a polarity-responsive device by effecting movement of switch device 60 to the position (not shown) wherein switch arm 62 establishes shunt circuit 77, switch arm 64 interrupts output circuit 32c of core means 20c, and switch arm 74 connects conductor 57 to the positive terminal of rectifier 34b. With switch device 60 in such position, output circuit 32c is in the deenergized condition and, consequently, core means 20c is rendered wholly ineffective. On the other hand, the establishment of shunt circuit 77 operates to render unidirectional element 58 ineffective, thereby permitting current to flow through control winding 24b of core means 20b for either polarity of current in circuit 12. With conductor 57 now connected to rectifier 34b, the output voltage of device 15 appears between conductor 57 and adjustable tap 46b to cause current flow through operating member 55 of translating device 19 in the direction indicated by the arrow 86 for either polarity of current in circuit 12.

Translating means 19 may comprise an indicating wattmeter device having a voltage winding 48 and a current winding 55 connected, respectively, for energization by the output voltages of conversion devices 13 and 15 to produce a resultant response which is a function of the magnitude of power of circuit 12. To effect indications of direction of power of circuit 12, the wattmeter device 19 may be provided with a scale having center zero.

On the other hand, translating means 19 may comprise a direct-current responsive watthour meter having a voltage winding 48, a current winding 55 and a rotatably mounted disk armature (not shown) disposed for rotation under influence of current flowing through windings 48 and 55. By connecting windings 48 and 55 for energization by voltage outputs of conversion devices 13 and 15 respectively, the number of revolutions of the disk armature (not shown) is caused to be representative of the amount of energy supplied to or by circuit 12. By reason of the inherent insulating qualities of the several core means 20a, 20b and 20c, the translating means 19 is effectively insulated from the direct-current circuit 12.

The relationship between the output and the input of each of the core means 20a, 20b and 20c is illustrated in Fig. 6. In this figure, ordinates and abscissae represent outputs and inputs of each of said core means. It will be observed that a substantially straight line or linear characteristic represented by the full-line curve (f) may be obtained over the operating range of each of the core means 20a, 20b and 20c with the exception of a small portion of the curve corresponding to low or zero inputs. Inspection of Fig. 6 will show that for low values of current and voltage of circuit 12, and consequently, for low inputs to core means 20a, 20b and 20c, alternating-currents appearing in output circuits 32a, 32b and 32c will deviate to a slight degree from linearity. Such deviation from linearity creates errors in the measurement of relatively low values of power since output voltages of conversion devices 13 and 15 which are applied to windings 48 and 55 of translating device 19 do not vary strictly in accordance with voltage and current of circuit 12.

The apparatus of Fig. 1 is utilized to advantage in connection with the measurement of relatively large values of power. Consequently, the inputs to core means 20a, 20b and 20c will normally be relatively high, and linearity will be obtained. However, if it is desired to effect the measurement of relatively low values of power, it may be desirable to provide a conversion device of the type illustrated in Fig. 2 in place of each of the voltage and current-responsive conversion devices 13 and 15 of Fig. 1.

Figure 2:
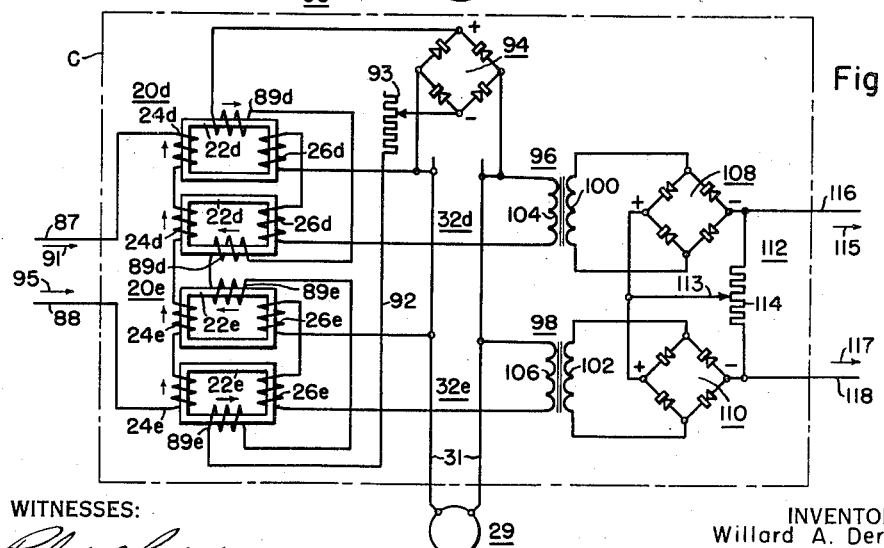
Fig. 2 is a schematic view illustrating a preferred form of conversion device suitable for utilization in the apparatus of Figs. 1 and 4.

As shown in Fig. 2, the rectangle C contains a conversion device 90 including electromagnetic means in the form of core means 20d and 20e. For increased accuracy of response to relatively low values of power of circuit 12, each of the devices 13 and 15 of Fig. 1 may be replaced by a conversion device of the type shown in Fig. 2. However, for most applications, sufficient accuracy of response is realized if conversion device 90 is subsituted for the polarity-responsive device 15 alone. As will appear hereinafter, conversion device 90 is also polarity responsive.

As illustrated, device 90 comprises two magnetic core means 20d and 20e similar in certain respects to core means 20a, 20b and 20c described hereinbefore. Each of the core means 20d and 20e includes a pair of magnetic cores 22d and 22e respectively. Each pair of cores may have a plurality of windings. For example, the pair of cores 22d and the pair of cores 22e have control windings 24d and 24e, output windings 26d and 26e, and bias windings 89d and 89e respectively.

Control windings 24d and 24e are connected for series energization by current flowing through input conductors 87 and 88 to effect magnetization of cores 22d and 22e in accordance with voltage or current of circuit 12 depending on the connections of conductors 87 and 88 relative to circuit 12. Output windings 26d and 26e are connected for series energization from a source of alternating current 29 through conductors 31 corresponding to source 28 and conductors 30, respectively, of Fig. 1. The polarities of the connections of windings 26d and windings 26e are such that alternating current flowing through windings 26d and windings 26e induces voltages in windings 24d and windgs 24e, respectively, which are opposed to each other.

Bias windings 89d and 89e are connected for series energization through current limiting resistor 93 from a source of direct current illustrated as comprising a rectifier device 94 energized from the source of alternating current 29. However, any convenient source of direct current may be utilized, as a means of effecting energization of bias windings 89d and 89e. Assuming current flow through conductor 87 in the direction indicated by arrow 91, then bias windings 89d of cores 22d are connected cumulatively relative to control windings 24d of cores 22d, whereas bias winding 89e of cores 22e are connected differentially relative to control windings 24e of cores 22e. Connections of bias windings 89d and 89e relative to control windings 24d and 24e in the manner described renders conversion device 90 responsive to direction of current flow of circuit 12 as will appear hereinafter.

Core means 20d and 20e have associated therewith output circuits 32d and 32e, respectively, for carrying alternating currents having magnitudes dependent upon the magnetic condition of cores 22d and cores 22e. Rectifier bridge means is provided including rectifier devices 108 and 110 connected respectively for energization through transformers 96 and 98 in accordance with alternating current flowing in circuits 32d and 32e. To this end transformers 96 and 98 have primary windings 104 and 106 connected in series circuit relation with respect to windings 26d and windings 26e. Secondary windings 100 and 102 of transformers 96 and 98 are connected to opposed terminals of rectifiers 108 and 110 as illustrated. The rectifier devices 108 and 110 are disposed in opposing relation to apply a resultant direct-current voltage to resistor means 114 through adjustable tap 113 of a voltage divider 112.

The nature of the voltages appearing across resistor 114 is illustrated in Fig. 5. By reference to Fig. 5 it will be seen that for current flow in conductor 87 in the direction indicated by arrow 91 the output of the core means 20d as measured at the resistor means 114 may be represented by the curve (a), which is shifted to the left from the unbiased position represented by the dotted curve (b) by reason of the cumulative effects of the bias winding 89d, while the output of the core means 20e may be represented by the curve (c), which is shifted to the right from the unbiased position represented by the dotted curve (d) by reason of the differential effects of the bias windings 89e. The resultant output voltage produced by the combined actions of core means 20d and 20e may be represented by the curve (e). This output voltage appears between conductors 116 and 118 and is a reversible differential voltage having linearity even for low inputs to core means 20d and 20e, and having polarity dependent upon direction of direct-current flow through circuit 12. The polarity-responsive characteristic of conversion device 90 will not be explained.

Assuming that conversion device 90 is substituted for the conversion device 15 of Fig. 1, and assuming that current flows through circuit 12 in the direction indicated by arrow 80, then the direction of current flow in conductor 87 is as indicated by arrow 91 and the direction of magnetic flux in cores 22d and 22e established by current flowing in windings 24d, 24e, 89d and 89e may be represented by the arrows adjacent said windings. It is seen then that by reason of cores 22d being magnetized to a greater extent than cores 22e, rectifier 108 is effective to produce a larger output voltage than rectifier 110 whereby current is caused to flow through conductor 118 in the direction indicated by arrow 117.

Assuming now that current flows through circuit 12 in the direction indicated by arrow 84, then the direction of current flow in conductor 88 is as indicated by arrow 95 and the direction of magnetic flux in cores 22d and 22e established by current flowing in windings 24d and 24e will be opposite to the direction indicated by the arrows adjacent said windings, whereas the direction of flux in cores 22d and 22e established by current flowing in windings 89d and 89e will remain unchanged. Consequently, cores 22e are now magnetized to a greater extent than cores 22d, and rectifier 110 is effective to produce a larger output voltage than rectifier 108 whereby current is caused to flow through conductor 116 in the direction indicated by arrow 115. Conductors 116 and 118 may be connected to the terminals of operating member 55 of translating device 19.

Another form of the invention is illustrated in Fig. 4. As there shown, a pair of conversion devices 119 and 121 enclosed respectively within the rectangles F and G are provided. Devices 119 and 121 are connected respectively for energization in accordance with voltage and current of a direct current circuit 123 including a source of direct current 120 and conductors 122 and 124. For present purposes it is assumed that direct-current may flow in either direction through conductor 124 of circuit 123. Each of conversion devices 119 and 121 is illustrated as being identical to the conversion device 13. Consequently, similar components of conversion devices 13, 119 and 121 are represented by similar reference characters followed by the suffix (a), (f) or (g) respectively. Since operation of conversion device 13 has been described heretofore, a discussion of the operation of conversion devices 119 and 121 is believed unnecessary.

As shown in Fig. 4, thermal conversion means is associated with devices 119 and 121. In the thermal conversion means provision is made for deriving a first quantity and a second quantity representative respectively of the sum and difference of voltage and current of the circuit 123. The thermal conversion means may conveniently comprise a bridge unit 126 having four resistance arms or heaters 128, 130, 132 and 134 connected to provide two opposed pairs of terminals 135 and 137. Voltage outputs of devices 119 and 121 are applied to bridge unit 126 through the pairs of terminals 137 and 135 respectively. The values of the resistances of arms 128, 130, 132 and 134 are chosen so as to be substantially identical. A pair of thermocouple units 133 and 136 are associated with heaters 128 and 130 respectively. Each thermocouple unit may include two thermocouple conductors constructed of dissimilar materials such as manganin and constantan. Other alloys having the requisite thermoelectric properties may be employed. The two thermoconductors of each of the thermocouple units 133 and 136 are united as by brazing or welding to provide thermojunctions 138 and 139. The thermocouple units 133 and 136 are connected in opposing relation to produce a resultant output for application to a translator 142. It can be shown that the application of voltage outputs of devices 119 and 121 to the terminals 137 and 135 respectively, operates to effect energization of thermojunctions 138 and 139 in accordance with the sum and the difference of voltage and current of the circuit 123. It can be shown further that by reason of the differential arrangement of thermocouple units 133 and 136, translator 142 is energized by a resultant voltage output which is substantially proportional to power of circuit 123.

Application of voltage outputs of devices 119 and 121 to bridge unit 126 in the manner aforesaid operates to cause the flow of equal currents through heaters 128 and 132 and equal currents through heaters 130 and 134. Consequently, thermojunctions 138 and 139 may be associated respectively with heaters 130 and 134 and heaters 128 and 132. Or if desired, a separate thermocouple unit may be associated with each of the heaters 128, 130, 132 and 134, the units associated with heaters 128 and 132 being connected in opposition to the units associated with heaters 130 and 134, and all of the units being connected in series.

The resultant output of thermocouple units 133 and 136 may be utilized for application to a translator 142 which conveniently may be a telemetering transmitter device of the type which is responsive to small voltage inputs, or for application to a common null type measuring instrument to provide an indication of the power of circuit 12.

It is to be understood that each of the conversion devices 119 and 121 of Fig. 4, may be replaced by a conversion device such as the device 90 of Fig. 2 whereby bridge unit 126 is rendered effective to produce a response which is a slightly truer representation of power of circuit 123. Furthermore, the substitution of a conversion device such as the device 90 or the device 15 for conversion device 121 renders bridge unit 126 polarity-responsive so that the voltage output thereof has polarity dependent on direction of power of circuit 123.

Referring now to Fig. 3, there is illustrated apparatus responsive to volt-amperes of an alternating-current circuit. As illustrated, alternating current bus members 146 are connected for energization from a source of alternating current 144. It will be assumed that source 144 has a frequency of 60 cycles per second. Conductor members 147 are connected for energization from source 144 through bus members 146 to provide an alternating current circuit 149.

Electromagnetic means in the form of a potential transformer device 148 having a primary winding 150 and a secondary winding 152 is provided. Primary winding 150 is connected for energization in accordance with voltage applied to circuit 149 to cause alternating-current voltages substantially proportional to voltage applied to circuit 149 to appear across secondary winding 152. These voltages are applied to two opposing terminals 153 of conversion means comprising a rectifier device 154.

Other electromagnetic means in the form of a current transformer device 174 is provided, the device 174 having a primary winding 176 connected for energization in accordance with current of circuit 149, and a secondary winding 178 disposed in inductive relation with the primary winding 176. Alternating-current voltages developed across secondary winding 178 by induction are applied to two opposing terminals 179 of conversion means comprising a rectifier device 180. Each of the rectifier devices 154 and 180 is connected to produce a pulsating direct-current voltage output substantially proportional to alternating-current voltage developed across the secondary windings 152 and 178 of the associated transformers 148 and 174 respectively. A suitable filter network may be associated with each of the rectifiers 154 and 180 to substantially eliminate alternating quantities from the rectifier output voltages.

As illustrated, thermal conversion means comprising a resistance bridge unit 158 having two pairs of terminals 173 and 175 is connected for energization through terminals 173 and 175 by direct-current voltage outputs of the rectifier devices 154 and 180 respectively. Bridge unit 158 is identical in all respects to bridge unit 126 of Fig. 4 and includes resistance arms or heaters 160, 162, 164 and 166 and thermocouple units 168 and 169 having thermojunctions 170 and 172 respectively. These components correspond respectively to resistance arms 128, 130, 132 and 134 and thermocouple units 133 and 136 having thermojunctions 138 and 139 of bridge unit 126. A description of the operation of bridge unit 158 is believed to be unnecessary.

The voltage output of the bridge unit 158 is substantially proportional to volt-amperes of circuit 123 and may be utilized for application to a translator 184 which may be either a telemetering transmitter device, or a common null type measuring instrument.

The association of saturable core means with direct-current power or energy responsive metering devices provides several advantages. Inclusion of core means in the voltage and current-responsive conversion devices effects complete insulation between the metering device and the direct-current-carrying circuit thereby facilitating the measurement of large values of direct-current power. A high degree of accuracy of response is obtained when a polarity-responsive device such as the device 90 illustrated in Fig. 2 is utilized in place of the voltage and current-responsive conversion devices 13, 15, 119 and 121 of Figs. 1 and 4. The provision of thermal conversion means effective to produce a small voltage output which is a function of the product of voltage and current of direct and alternating-current circuits permits highly accurate telemetering of alternating-current volt-ampere magnitude or demand or volt-ampere hours, as well as direct-current power or energy.

Although the invention has been described with reference to certain specific embodiments thereof, numerous modifications falling within the spirit and scope of the invention are possible.

We claim as our invention:

1. In a device responsive to the magnitude of power of a direct-current circuit, first and second magnetic core means, first and second control winding means linking respectively said first and second core means, first and second impedance winding means linking respectively said first and second core means, said first and second control winding means being arranged for energization from said circuit to effect magnetization of said first and second core means in accordance with voltage and current respectively of the circuit, first and second rectifier means, each of said first and second rectifier means being arranged for energization from a source of alternating current through a separate one of said first and second impedance winding means to produce first and second direct output currents, and translating means connected for energization in accordance with said first and second direct output currents for producing a resultant response representative of the power of the direct-current circuit.

2. In a device responsive to the magnitude of power of a direct-current circuit, first and second magnetic core means, first and second control winding means linking respectively said first and second core means, first and second impedance winding means linking respectively said first and second core means, said first and second control winding means being arranged for energization from said circuit to effect magnetization of said first and second core means in accordance with voltage and current respectively of the circuit, first and second rectifier means, each of said first and second rectifier means being arranged for energization from a source of alternating current through a separate one of said first and second impedance winding means to produce first and second direct output currents, and translating means connected for energization in accordance with said first and second direct output currents for producing a resultant response representative of the power of the direct-current cicuit, said translating means including thermal conversion means comprising a resistance bridge unit having first and second pairs of input terminals, and thermocouple means associated with said bridge unit, said first and second pairs of input terminals being connected for energization respectively in accordance with said first and second direct output currents.

3. In a device responsive to the magnitude of power of a direct-current circuit, first and second pairs of magnetic cores, first and second control windings each linking a separate core of said first pair of cores, third and fourth control windings each linking a separate core of said second pair of cores, said first and second control windings being arranged for series energization from said circuit to effect magnetization of said first pair of cores in accordance with voltage of the circuit, said third and fourth control windings being arranged for series energization from said circuit to effect magnetization of said second pair of cores in accordance with current of the circuit, first and second impedance windings each linking a separate core of said first pair of cores, third and fourth impedance windings each linking a separate core of said second pair of cores, said first and second impedance windings being arranged in series circuit relation with polarity to provide zero resultant coupling relative to said first and second control windings, said third and fourth impedance windings being arranged in series circuit relation with polarity to provide zero resultant coupling relative to said third and fourth control windings, first and second bridge rectifiers, said first bridge rectifier being arranged for energization from a source of alternating current through said first and second impedance windings to produce a first direct output current, said second bridge rectifier being arranged for energization from a source of alternating current through said third and fourth impedance windings to produce a second direct output current, and translating means connected for energization in accordance with said first and second direct output currents for producing a resultant response representative of the power of the direct-current circuit.

4. In a device responsive to the magnitude of power of a direct-current circuit, first and second pairs of magnetic cores, first and second control windings each linking a separate core of said first pair of cores, third and fourth control windings each linking a separate core of said second pair of cores, said first and second control windings being arranged for series energization from said circuit to effect magnetization of said first pair of cores in accordance with voltage of the circuit, said third and fourth control windings being arranged for series energization from said circuit to effect magnetization of said second pair of cores in accordance with current of the circuit, first and second impedance windings each linking a separate core of said first pair of cores, third and fourth impedance windings each linking a separate core of said second pair of cores, said first and second impedance windings being arranged in series circuit relation with polarity to provide zero resultant coupling relative to said first and second control windings, said third and fourth impedance windings being arranged in series circuit relation with polarity to provide zero resultant coupling relative to said third and fourth control windings, first and second bridge rectifiers, said first bridge rectifier being arranged for energization from a source of alternating current through said first and second impedance windings to produce a first direct output current, said second bridge rectifier being arranged for energization from a source of alternating current through said third and fourth impedance windings to produce a second direct output current, and translating means connected for energization in accordance with said first and second direct output currents for producing a resultant response representative of the power of the direct-current circuit, said translating means including thermal conversion means comprising a resistance bridge unit having first and second pairs of input terminals, and thermocouple means associated with said bridge unit, said first and second pairs of input terminals being connected for energization respectively in accordance with said first and second direct output currents.

5. In an electrical system, a direct-current circuit, and a device responsive to the magnitude of power of said circuit, said device including first and second magnetic core means, first and second control winding means linking respectively said first and second core means, first and second impedance winding means linking respectively said first and second core means, said first and second control winding means being connected for energization from said circuit to effect magnetization of said first and second core means in accordance with voltage and current respectively of the circuit, a source of alternating current, first and second rectifier means, each of said first and second rectifier means being connected for energization from said source through a separate one of said first and second impedance winding means to produce first and second direct output currents, and translating means connected for energization in accordance with said first and second direct output currents for producing a resultant response representative of the power of the direct-current circuit.

6. In an electrical system, a direct-current circuit, and a device responsive to the magnitude of power of said circuit, said device including first and second magnetic core means, first and second control winding means linking respectively said first and second core means, first and second impedance winding means linking respectively said first and second core means, said first and second control winding means being connected for energization from said circuit to effect magnetization of said first and second core means in accordance with voltage and current respectively of the circuit, a source of alternating current, first and second rectifier means, each of said first and second rectifier means being connected for energization from said source through a separate one of said first and second impedance winding means to produce first and second direct output currents, and a watt-meter device having a voltage element and a current element, said voltage and current elements being connected for energization respectively in accordance with said first and second direct output currents.

7. In a device responsive to the magnitude of power of a direct-current circuit, first and second magnetic core means, first and second control winding means linking respectively said first and second core means, first and second impedance winding means linking respectively said first and second core means, said first and second control winding means being arranged for energization from said circuit to effect magnetization of said first and second core means in accordance with voltage and current respectively of the circuit, first and second rectifier means, each of said first and second rectifier means being arranged for energization from a source of alternating current through a separate one of said first and second impedance winding means to produce first and second direct output currents, and a wattmeter device having a voltage element and a current element, said voltage and current elements being connected for energization respectively in accordance with said first and second direct output currents.

8. In a device responsive to the magnitude of power of a direct-current circuit, first and second pairs of magnetic cores, first and second control windings each linking a separate core of said first pair of cores, third and fourth control windings each linking a separate core of said second pair of cores, said first and second control windings being arranged for series energization from said circuit to effect magnetization of said first pair of cores in accordance with voltage of the circuit, said third and fourth control windings being arranged for series energization from said circuit to effect magnetization of said second pair of cores in accordance with current of the circuit, first and second impedance windings each linking a separate core of said first pair of cores, third and fourth impedance windings each linking a separate core of said second pair of cores, said first and second impedance windings being arranged in series circuit relation with polarity to provide zero resultant coupling relative to said first and second control windings, said third and fourth impedance windings being arranged in series circuit relation with polarity to provide zero resultant coupling relative to said third and fourth control windings, first and second bridge rectifiers, said first bridge rectifier being arranged for energization from a source of alternating current through said first and second impedance windings to produce a first direct output current, said second bridge rectifier being arranged for energization from a source of alternating current through said third and fourth impedance windings to produce a second direct output current, and a wattmeter device having a voltage element and a current element, said voltage and current elements being connected for energization respectively in accordance with said first and second direct output currents.

9. In an electrical system, a direct-current circuit adapted to carry current in either of two directions, and a power measuring device responsive to the direction of current flow of said circuit, said device including first, second and third pairs of magnetic cores, first, second and third control winding means linking respectively said first, second and third pairs of cores, said first control winding means being connected for energization from the direct-current circuit in accordance with voltage of the circuit, said second and third control winding means being connected for parallel energization from the direct-current circuit in accordance with current of the circuit, first, second and third impedance winding means linking respectively said first, second and third pairs of cores, first and second unidirectional elements, means connecting each of said unidirectional elements in series circuit relation with respect to a separate one of said second and third control winding means with polarity to permit energization of a separate one of said second and third control winding means for each direction of current flow through said direct-current circuit, a source of alternating current, first, second and third bridge rectifiers, said first bridge rectifier being connected for energization from said source through said first impedance winding means to produce a first direct output current, each of said second and third bridge rectifiers being connected for energization from said source through a separate one of said second and third impedance winding means to produce a second direct output current, and translating means connected for energization in accordance with said first and second direct output currents for producing a resultant response representative of the magnitude of power of the direct-current circuit and indicative of the direction of current flow of the direct-current circuit.

10. In an electrical system, a direct-current circuit adapted to carry current in either of two directions, and a power measuring device responsive to the direction of current flow of said circuit, said device including first, second and third pairs of magnetic cores, first, second and third control winding means linking respectively said first, second and third pairs of cores, said first control winding means being connected for energization from the direct-current circuit in accordance with voltage of the circuit, said second and third control winding means being connected for parallel energization from the direct-current circuit in accordance with current of the circuit, first, second and third impedance winding means linking respectively said first, second and third pairs of cores, first and second unidirectional elements, means connecting each of said unidirectional elements in series circuit relation with respect to a separate one of said second and third control winding means with polarity to permit energization of a separate one of said second and third control winding means for each direction of current flow through said direct-current circuit, a source of alternating current, first, second and third bridge rectifiers, said first bridge rectifier being connected for energization from said source through said first impedance winding means to produce a first direct output current, each of said second and third bridge rectifiers being connected for energization from said source through a separate one of said second and third impedance winding means to produce a second direct output current, and a wattmeter device having a voltage element and a current element, said voltage and current elements being connected for energization respectively in accordance with said first and second direct output currents.

11. In an electrical system, a direct-current circuit adapted to carry current in either of two directions, and a power measuring device responsive to the direction of current flow of said circuit, said device including first, second and third pairs of magnetic cores, first, second and third control winding means linking respectively said first, second and third pairs of cores, said first control winding means being connected for energization from the direct-current circuit in accordance with voltage of the circuit, said second and third control winding means being connected for parallel energization from the direct-current circuit in accordance with current of the circuit, first, second and third impedance winding means linking respectively said first, second and third pairs of cores, first and second unidirectional elements, means connecting each of said unidirectional elements in series circuit relation with respect to a separate one of said second and third control winding means with polarity to permit energization of a separate one of said second and third control winding means for each direction of current flow through said direct-current circuit, a source of alternating current, first, second and third bridge rectifiers, said first bridge rectifier being connected for energization from said source through said first impedance winding means to produce a first direct output current, each of said second and third bridge rectifiers being connected for energization from said source through a separate one of said second and third impedance winding means to produce a second direct output current, and thermal conversion means comprising a resistance bridge unit having first and second pairs of input terminals, and thermocouple means associated with said bridge unit, said first and second pairs of input terminals being connected for energization respectively in accordance with said first and second direct output currents.

References Cited in the file of this patent

UNITED STATES PATENTS

| | | |
|---|---|---|
| 1,620,126 | Paine | Mar. 8, 1927 |
| 1,808,334 | Angus | June 2, 1931 |
| 2,338,423 | Geyger | Jan. 4, 1944 |
| 2,614,139 | Baxter | Oct. 14, 1952 |
| 2,656,511 | Specht | Oct. 20, 1953 |